Figure 3:
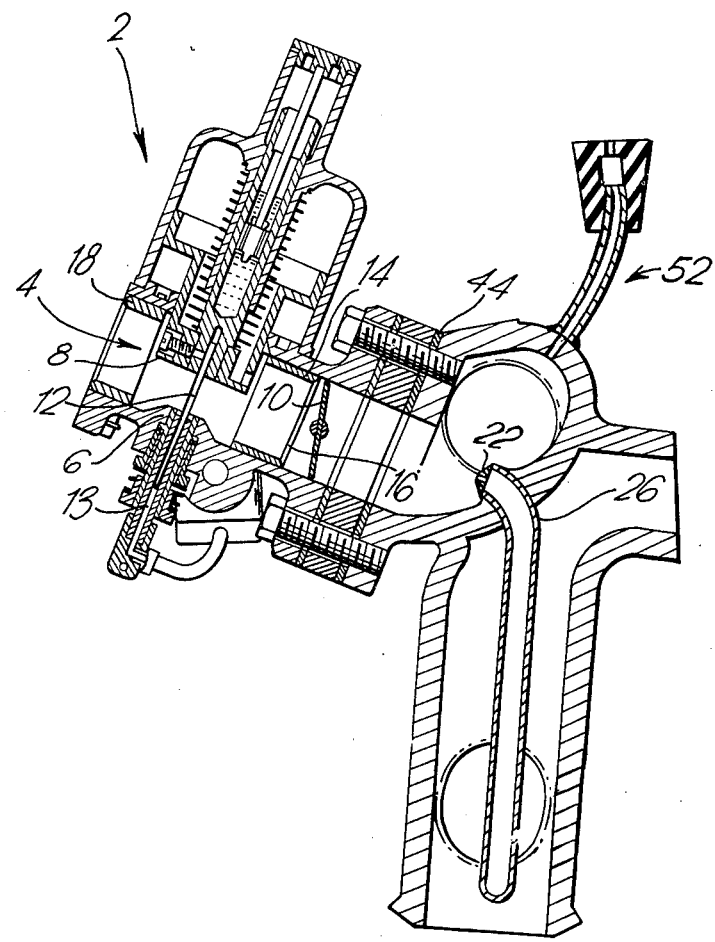

United States Patent [19]

Bun

[11] 3,919,988

[45] Nov. 18, 1975

[54] INDUCTION SYSTEMS FOR INTERNAL COMBUSTION ENGINES

[76] Inventor: Cheong Chee Bun, 3 Lorong Sultan, Kuala Lumpur, Malaysia

[22] Filed: Jan. 5, 1971

[21] Appl. No.: 104,028

[30] Foreign Application Priority Data
Jan. 9, 1970 United Kingdom................. 1176/70
Jan. 9, 1970 United Kingdom................. 1177/70

[52] U.S. Cl.......... 123/119 E; 123/1 A; 123/119 D; 123/25 B; 123/122 R; 123/122 B; 123/122 C; 123/122 D

[51] Int. Cl.².................... F02B 33/00; F02M 31/00

[58] Field of Search........ 123/25, 25 A, 25 B, 25 D, 123/25 P, 119 R, 119 D, 119 F, 122 R, 122 B, 122 C, 122 D, 122 E, 119 E, 1 A

[56] References Cited
UNITED STATES PATENTS

| | | | |
|---|---|---|---|
| 1,164,930 | 12/1915 | Clairmont | 123/119 D |
| 1,249,968 | 12/1917 | Kelly | 123/122 D |
| 1,267,484 | 5/1918 | White | 123/122 E |
| 1,364,543 | 1/1921 | Calow | 123/119 D |
| 1,392,473 | 10/1921 | Ball | 123/122 E |
| 1,630,048 | 5/1927 | Balachowsky et al. | 123/119 E |
| 1,717,767 | 6/1929 | Diaz | 123/119 E |
| 1,942,187 | 1/1934 | Ruffino | 123/119 D |
| 2,252,972 | 8/1941 | Grevas | 123/122 D |
| 2,608,389 | 8/1952 | Boyce | 123/122 D |
| 2,715,894 | 8/1955 | Shirrell | 123/25 |
| 2,723,652 | 11/1955 | Kukovac | 123/25 |
| 2,789,796 | 4/1957 | Mansfield | 123/119 D |
| 2,899,949 | 8/1959 | Hicks | 123/119 E |

Primary Examiner—Charles J. Myhre
Assistant Examiner—Ronald B. Cox
Attorney, Agent, or Firm—Baldwin, Wight & Brown

[57] ABSTRACT

In an internal combustion engine, air and/or steam is drawn into the induction manifold of the engine through at least one tube provided with a flow restrictor, the tube being made of copper and passing through the exhaust manifold so that it becomes heated to a high temperature thus causing oxidation of the copper and induction of copper oxide particles into the induction manifold.

20 Claims, 4 Drawing Figures

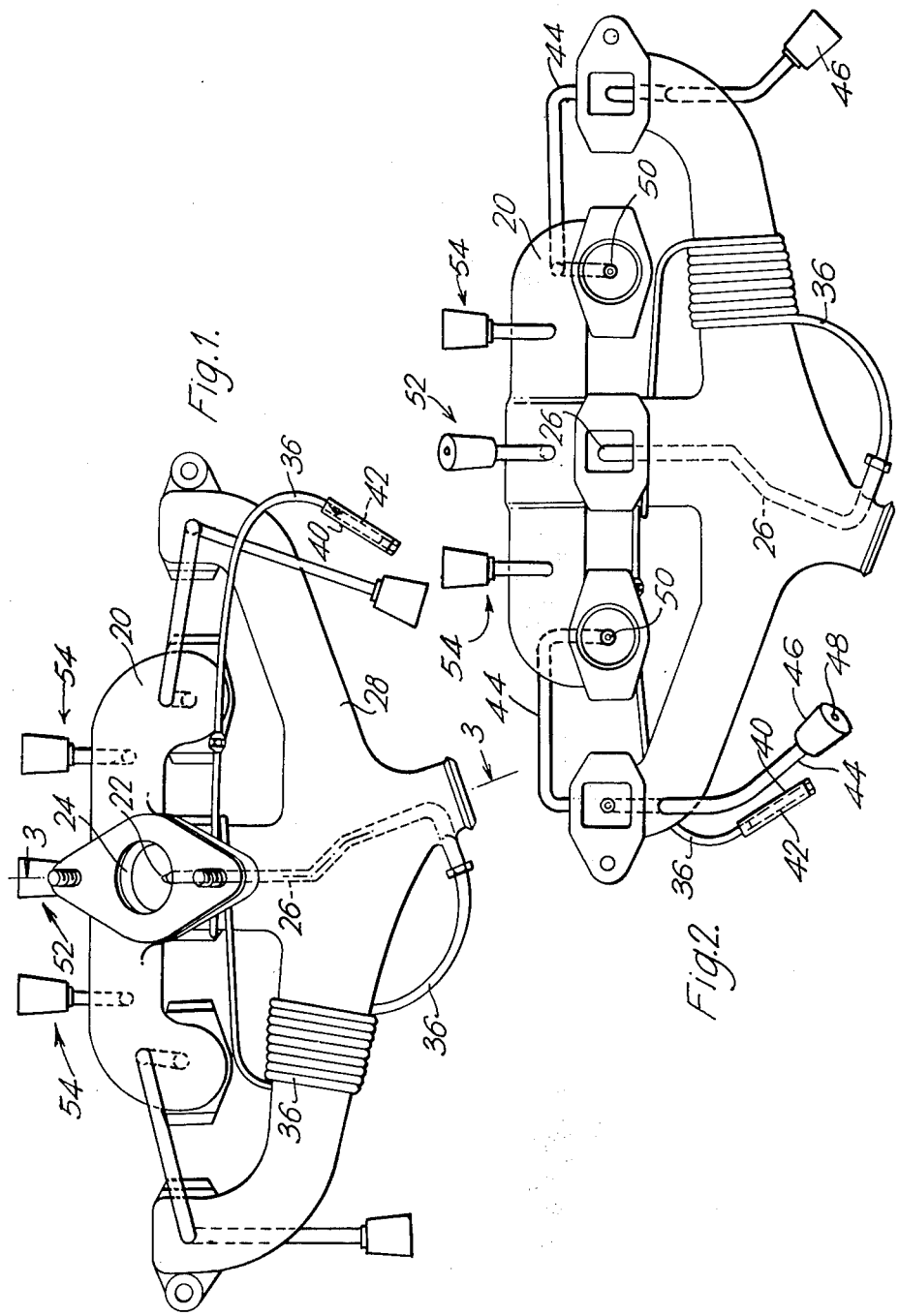

INDUCTION SYSTEMS FOR INTERNAL COMBUSTION ENGINES

This invention relates to internal combustion engines using hydrocarbon fuels.

The object of the invention is to obtain improved combustion of the fuel, and hence lower fuel consumption and/or lower emission of undesirable exhaust constituents and/or improved power output, and/or reduced engine fouling and/or the ability to operate a given engine on a lower grade of fuel than would otherwise be possible.

It is known that copper compounds have a pronounced catalytic effect in promoting the oxidation of hydrocarbon fuels. Thus it is common practice to add a copper sequestrating agent to such fuels in order to inhibit the oxidising effects of minute traces of copper which may have been introduced into the fuel during refining, or which may enter the fuel as a result of its contact with copper or brass tanks or piping, since otherwise partial oxidation of the fuel may occur with the production of gums and/or sludges which can cause blockage or interference with fuel pumping metering and carburetting devices. It will be understood therefore that the presence of copper compounds in conjunction with hydrocarbon fuels has generally been considered undesirable.

I have found however that the introduction of copper compounds in a certain manner into the induction systems of internal combustion engines has highly beneficial effects, and although the exact manner in which these effects are produced is not fully understood beyond that the action is clearly catalytic, it is found that combustion chamber deposits are substantially reduced, and indeed existing deposits may be largely removed, combustion of the fuel is substantially more complete, thus improving engine efficiency giving an improved power output and/or reduced fuel consumption as well as reducing the quantities of incompletely burnt compounds exhausted from the engine, whilst it is often possible to use a fuel of lower quality (e.g. reduced anti-knock rating) without adverse effects.

It is believed that this action is due to copper oxide being deposited in the combustion chamber or chambers of the engine and possibly in other parts of the engine, including the exhaust system, where fuel oxidation may take place. However, the introduction and maintenance of such copper oxide deposits presents considerable difficulties. Whilst there are copper compounds which are soluble in hydrocarbon fuels to a limited degree and which will decompose under the influence of heat to give copper oxide, the addition of such compounds to hydrocarbon fuels is undesirable for reasons already discussed, and also, since, to take full advantage of the influence of the copper oxide, altered engine tuning may be necessary, the use of copper compounds as fuel additives may not be convenient in practice.

An alternative approach is to introduce copper compounds directly into the induction tract of the engine, but here is the problem of finding a reliable and inexpensive means of dispensing minute quantities of such compounds during running of the engine. The copper compounds utilized will be solids, and must clearly be finely divided; it is well known that the continuous dispensing of very small quantities of finely divided solids presents acute difficulties.

According to the invention, the induction system of an internal combustion engine includes a heat exchanger element adapted to be exposed to hot exhaust gases leaving the engine and to transfer their heat to copper or a copper rich alloy in contact with a stream of oxidizing gas entering the induction tract, whereby the copper or copper rich alloy is raised to such a temperature during operation of the engine that a non coherent oxide film is formed on the surface of the copper or alloy and particles from this film are entrained by the gas stream.

This system overcomes the problem of dispensing chemicals into the induction tract by slowly generating copper oxide in situ, the oxide generated being entrained by the gas stream itself and carried into the induction tract of the engine. In addition, the freshly generated oxide is introduced as hot particles carried in a hot gas and therefore can start to act, in the case of carburettor induction systems, on the fuel/air mixture even before it reaches the combustion chamber or chambers of the engine.

It is important that the copper or copper rich alloy be raised by the heat exchanger to a sufficient temperature so that a non-coherent oxide film is produced thereon, since otherwise a coherent passive film will be produced which will not be dispensed into the induction tract and will prevent further oxidation of the copper. Similarly, the gas stream must be free from contaminants which would themselves under the conditions obtaining in the heat exchanger, deposit or cause a coherent protective film on the copper. The oxidising gas is preferably air, a stream of air through the heat exchanger to the induction tract being set up by the pressure difference normally existing between the inlet tract of an internal combustion engine downstream of a throttle valve and the surrounding atmosphere.

The invention is primarily intended for application to two or four stroke reciprocatory engines, also rotary piston engines such as the Wankel, whether operating on petrol, l.p.g., diesel or kerosine fuels. However, it would seem probable that it would also be applicable to gas turbine and jet engines and such use is not disclaimed.

Figure 4:
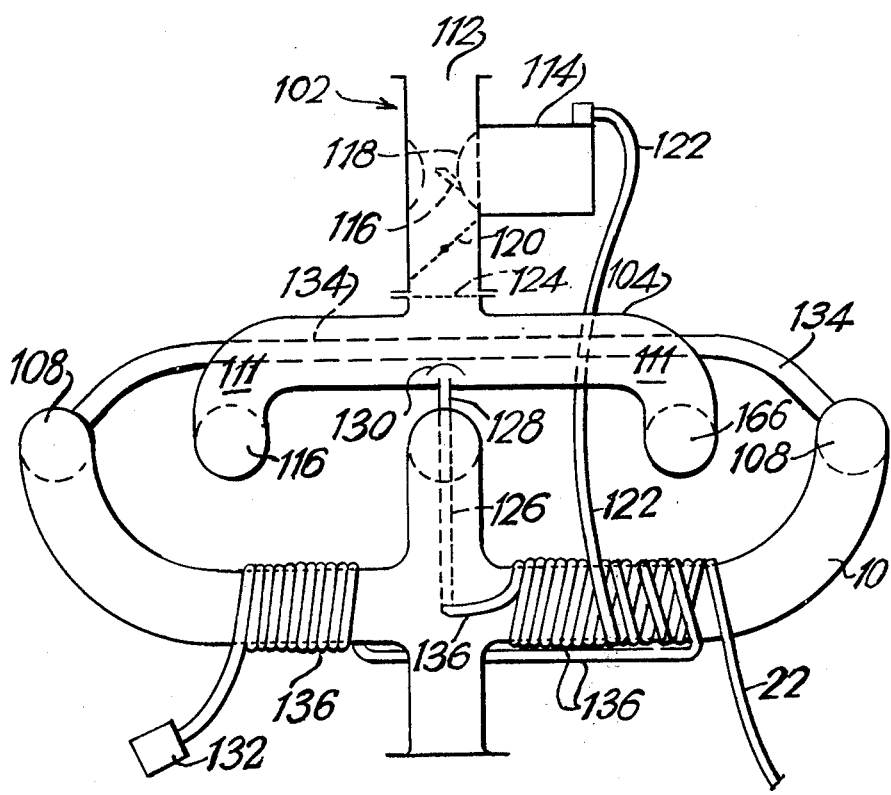

An exemplary embodiment of the invention is described with reference to the accompanying drawings in which:

FIG. 1 is an elevational view of a combined inlet and exhaust manifold assembly for an internal combustion engine, from its side remote from the engine, FIG. 2 is an elevational view of the same assembly seen from its side nearest the engine, and FIG. 3 is a section on the line III in FIG. 1, showing also (in section) a carburettor mounted on the manifold,, FIG. 4 is an elevational view of an alternative form of combined inlet and exhaust manifold assembly, intended for an engine running on kerosine or a kerosine/petrol mixture.

Referring to the drawings, which show the invention applied to the induction system of a British Motor Corporation 'A' series engine equipped with a single S.U. instrument and as such will not be described in detail as to its construction and working. It has a bore 4, into which project a bridge 6 and a piston 8 so as to form a variable choke, and a throttle valve 10 at the downstream end of the bore. The piston 8 carries a needle 12 entering a jet 13 situated in the bridge 6.

The only part of the basic instrument which is modified is the needle 12, the profile of which is altered both to adjust the air/fuel ratio of the mixture fed to the engine under various running conditions and to compensate for effects produced by the modification described below. It would of course be possible as an alternative to reduce the jet size or to alter both jet and needle. However, a collar 14 is introduced into the carburettor bore between the choke and the throttle valve 10, this being provided with a chamfer 16 to allow free movement of the valve: it will be understood that with other types of models of carburettor this chamfer may not be necessary. Preferably a second collar 18 is introduced at the entrance to the carburettor bore. In the present example they are dimensioned so as to reduce the cross sectional area of the carburettor bore by about 20% but with different installations different proportions may be found appropriate. As with all adjustments of parameters in carburettor installations, experiment may be required to find the optimum dimensions both of the needle and/or jet.

It should be appreciated that though a carburettor of the 'variable choke' variety has been employed in the example described, the invention is equally applicable to carburettors of the 'fixed choke' type, and to multiple carburetor installations, in which case the modifications are made in respect of each choke.

It should also be appreciated that the collar 14 is more important than the collar 18, the insertion of which may not prove necessary or practicable in all installations.

The effect of the insertion of the collar 14 or collars 14, 18 is apparently to cause a marked increase in gas velocity through the choke, and hence an increase in depression at this region, the increase in fuel flow that would otherwise result being prevented by the alteration in the size of the needle 12 and/or the jet 13.

Although the increased gas velocity through the choke and the collar 14 down to the throttle valve, accompanied in the present instance by the increased velocity of fuel discharge through the jet 13 into the choke, lead to improved atomisation reflected by improved performance of the engine itself due to improved mixture distribution, the essential feature of the invention resides in the modification of the manifold 20 which is described below. With this end in view, a gas discharge orifice 22 is formed in the wall of the inlet manifold immediately opposite and facing the riser 24 carrying the flange on which the carburettor is mounted at the entrance of the manifold. This orifice, whose size is not critical, is at the end of a pipe comprising a relatively large bore copper pipe 26 extending from the jet through a branch of an exhaust manifold 28 and at its far end extending through the wall of the manifold 28 to join a relatively smaller bore tube 36 wound round and brazed to the exterior of the manifold 28. The tube 36 terminates in a cap 40 of flexible material, this cap being closed at its remote end and provided with an air metering aperture 42. It is found that this arrangement silences the undesirable hissing noise normally associated with manifold air admission. The metering aperture may be very small, preferably of 0.4 – 0.8 mm diameter for the sizes of engine commonly used in private cars. Too high an air flow rate will make it impossible to obtain proper idling of the engine, and may cool the interior of the tube 26 excessively whilst too small a rate may not entrain the oxide particles. The optimum rate may be found by experiment, but is unlikely to lie outside the range of air flows provided for example by induction by manifold vacuum through an aperture having a diameter between 0.2 and 3.0 millimeter.

In addition, or alternatively, to the modification so far described, additional copper tubes may be provided, each extending from a cap 46 with a metering orifice 48, similar to the cap 40 and aperture 42, through an arm of the exhaust manifold 28 and into an arm of the inlet manifold 20, through which it extends to a discharge jet 50 extending into an inlet port of the engine to which the manifold is fitted. The number of such tubes 44 is preferably the same as the number of branches of the inlet manifold or the number of inlet ports possessed by the engine. The orifices 48 will have a size in the same range as proposed for the orifice 42.

On running the engine, hot gases are discharged through the exhaust manifold which becomes heated to a high temperature, whilst a depression is set up in the inlet manifold tending to draw air into the tube 36 through the metering apertures 42 and 48 in the caps 40 and 46. The tube 36, being in thermal contact with the hot manifold 28, heats the air which passes into the pipe 26 which is raised to a very high temperature by the action of the exhaust gases upon it. Similarly, the gases passing through the tubes 44 is heated where these tubes pass through the exhaust manifold. The hot air acting on the hot copper oxidises the surface of the latter to form copper oxide, the temperature of those parts of the copper tubes heated by the exhaust gas being raised thereby to a temperature such that the coating formed is not coherent. The air stream therefore entrains particles of copper oxide which are carried through the jet 22 into the manifold and through the jets 50 into the inlet ports, and hence into the engine, where a deposit of small amounts of copper oxide builds up as the engine runs. It should be understood that the build up of such deposits will be gradual, and will normally be associated with the gradual disappearance of any preexisting deposits which appear to be loosened by the action of the copper. Thus the full advantages of the invention will not be obtained immediately, and on the other hand they will not be lost immediately should the modified manifold be replaced by an unmodified manifold, since some time will elapse before the copper oxide deposits in the engine are dispersed or smothered.

Considerable variations in the arrangement described are possible. Thus any conventional carburetion system can be used, it only being desirable that the carburettor tuning be altered, firstly to compensate for the additional air induced into the manifold and secondly to adjust the strength of the mixture supplied, since the invention normally makes it possible to obtain satisfactory running on weaker mixtures than are normally required for satisfactory running in any given engine.

Secondly, the heat exchange arrangements for oxidising the copper may be varied widely, provided that it is ensured that a protective film which either prevents oxidation or prevents dispersal of the oxide is not formed. Thus an ordinary hot-spot between the exhaust and inlet manifolds is not satisfactory, even if made of copper, since it becomes covered with a film of deposits formed by decomposition of the fuel in the mixture supplied to the manifold, and moreover is cooled excessively by evaporation of the fuel and by the cold air inducted with the result that a coherent oxide is formed on the copper.

The arrangement described above is satisfactory provided that the copper tubes 26 and 44 are situated in the exhaust manifold sufficiently close to the exhaust ports of the engine for the exhaust gases not to have fallen too far in temperature, and provided that the wall thickness of the tube is sufficient to give it a reasonable life in spite of the erosion due to oxidation to which it is subject. The contact of the tube with the manifold walls at its ends and the high heat conductivity of the copper prevent the tube being raised to such a temperature that the copper melts. In a variation of this arrangement, the tube is filled or lined with copper guaze or other copper material allowing the free passage of air in which case it may not be necessary for the outer tube to be formed of copper. In this case, provision could be made for replacing the gauze when necessary. However, with these modifications, great care is required to ensure that the tube does not become clogged. The tube 36 provides preheating of the air supplied to the pipe 26 so as to avoid excessive cooling of the copper. This tube may also be of copper, though other materials such as steel, capable of standing up to the temperatures employed, may be utilized.

One minor disadvantage of the arrangement described is that the air flow through the tube 26 is dependent on the depression existing in the inlet manifold, and where this depression is maintained at a low level for long periods, as in the case of prolonged and uninterrupted high speed cruising under full throttle conditions, copper oxide may not be supplied to the engine, and existing deposits may be dispersed, resulting in a gradual loss of the benefits of the invention. If necessary, this can be overcome by providing means to pump air into the tube 26, but I prefer to avoid this complication if possible.

One or more air bleeds may be provided in the inlet manifold in order to enable fine adjustment of the strength of the mixture supplied under idling and part or closed throttle conditions. Thus a bleed 52 may be provided to provide overall adjustment of the strength of the mixture entering the inlet manifold, and bleeds 54 may be provided for individual adjustment of the mixture strength in each branch of the manifold. Preferably the bleeds are provided by orificed caps similar to the cap 40 mounted on the outer end of pipe stubs penetrating the wall of the inlet manifold 20. The orifices in the caps will have dimensions in the same ranges as proposed for the orifice 42, but will generally be smaller than this latter orifice.

The embodiment of the invention described above has been intended for use with a petrol engine equipped with a carburettor, but it should be understood that it is also applicable to engines designed to utilize other hydrocarbon fuels. In addition, use of the invention will in certain cases enable the use of fuels of a different type to that for which the engine was designed. Thus in many cases it is possible to run a petrol engine on kerosine provided that suitable vapourising arrangements are provided, even though the octane rating of kerosine falls far short of that normally required for petrol engines. It may be advantageous to include exhausted heated copper heat exchanger elements in the vapouriser, in order to provide a degree of catalytic decomposition of the fuel before it enters the engine. A manifold assembly for this purpose is described with reference to FIG. 4.

A carburettor 102 is connected to an inlet manifold 104 and hence to inlet ports 106 of the engine (not shown), the exhaust gases from the engine passing from ports 108 through an exhaust manifold 110.

The carburettor is conventional and comprises a body defining a bore 112, a float chamber 114, and a main jet 116 fed from the float chamber and discharging into a choke 118. The passage of air through the bore 112 is controlled by a throttle valve 120. Further conventional features of the carburettor and manifolds are not shown.

Fuel is supplied to the float chamber 114 through a fuel line 122, this being wound round a branch of the exhaust manifold 110 so as to preheat the fuel. The amount of preheating should be adjusted so as to avoid causing vapour lock. The carburettor operates in the usual way so as to provide a fuel/air mixture of appropriate strength though some adjustment to the carburettor tuning, assuming this is adjusted for gasoline fuel, will be necessary to obtain optimum results. For example a reduction in choke diameter is generally advantageous.

Between the carburettor and the inlet manifold 104 is placed a screen 124 of copper mesh or gauze having for example a mesh size of about 40 to the inch, this screen assisting in atomisation of the fuel. Passing through the inlet manifold is a copper tube 134 of relatively large diameter (for example about ½ inch bore) connecting the two outer branches of the exhaust manifold 110. This provides a heat exchanger effective to vapourize at least some of the higher boiling fractions of the fuel.

Additionally, a copper tube 136 is wound around the exhaust manifold 110 and is connected to a copper tube 126 passing through the central branch of this manifold to an orifice 128 in the wall of the inlet manifold beneath the carburettor 102. A copper deflector plate 130 is placed above the orifice, and, heated by the hot air emerging from the orifice, acts as a supplementary hot spot. At the outer end of the copper pipe 136 is a flow restrictor 132 which acts to limit the amount of air entering the pipe 126 so that this is small compared with the amount of mixture passed to the manifold by the carburettor. A restrictor comprising a 1/16 inch orifice has been found suitable but experiment may be made with orifices in the range specified for the orifice 42. The air passing through the pipe is heated by heat transfer from the exhaust manifold and, in the final portion passing through the manifold, directly by the exhaust gases themselves. The interior of the pipe in this portion is oxidised by the air passing therethrough, the oxide film produced being non-coherent due to the high temperature of the tube. Thus small quantities of copper oxide are entrained by the air and pass into the engine induction system and thus the combustion chambers of the engine, the catalytic effect of this oxide modifying the combustion of the fuel and enabling the engine to perform satisfactorily. Indeed, in some cases, better performances has been observed using kerosine fuel than with the same engine running on gasoline fuel using its original induction system.

The tube 134 becomes heated by the exhaust gases passing therethrough and acts as a vapouriser for the mixture passing through the manifold 104. The screen 124 assists in atomising the fuel content of the mixture, and where a petrol/kerosine mixture is used as fuel, assists vapourization of the lower boiling constituents of the petrol during starting, thus enabling the engine to be started on the same fuel, instead of provision having to be made for starting the engine on petrol as is normally necessary with engines run on kerosine. Where kerosine is used as fuel without any admixture of petrol, then supplementary means are required to obtain initial vapourisation of the kerosine before the engine has warmed up. For example, an additional copper tube may be passed through the manifold parallel to the tube 134, which tube is preheated electrically during starting.

Considerable variations in the arrangement described are possible as previously discussed in relation to the first embodiment described.

In certain cases it may be desirable to lower the compression ratio of the engine somewhat. This may be achieved by inserting an additional gasket, for example of ⅛ inch sheet aluminium, beneath the cylinder head of the engine.

Whilst the use of copper parts has been described in order to provide the necessary copper oxide catalyst, copper alloys may also be utilized, but in the case of alloys, it is obviously important that these should not undergo changes under prolonged heating that will render them physically incapable of maintaining any necessary mechanical function. Thus, brass tends to be subject to such deterioration.

As a further variation, instead of using air as an oxidising gas, it may be preferred to utilise aerated superheated steam, or a mixture of air and superheated steam; the steam may be generated by allowing controlled quantities of water to enter the pipe 36 or 136.

It will be understood that the quantities of copper compounds introduced into the engine are necessarily extremely small since they are provided by stow oxidation of the copper pipes. Since the use of the invention can permit the use of unleaded petrol, the advantage to be gained is obvious, since instead of the comparatively high amount of poisonous lead compounds emitted by engines running on leaded petrol, only very minute amounts of copper compounds will be emitted. Moreover, copper compounds which pass through the engine into the exhaust system of the vehicle may have further beneficial effects in catalysing the combustion of any unburnt residues leaving the engine. It should also be understood that the injection of heated air into the inlet manifold or ports which takes place with the apparatus of the present invention may of itself be in part responsible for the results obtained.

With respect to the forming of non-coherent copper oxides as discussed hereinabove, it is known that such non-coherent copper oxides are formed in air at temperatures above 200°C. Specific reference thereto is found on page 249 of the text entitled OXIDATION OF METALS AND ALLOYS by O. Kubaschewski and B. E. Hopkins, 1962, Second Edition, published by Butterworths, London, Reference is also made to page 696 of Volume 81 (1952-3) of the Institute of Metals Journal.

What I claim is:

1. An induction system for an internal combustion engine, including a heat exchanger element situated in the path of hot exhaust gases leaving the engine, said heat exchanger element including an oxide forming element containing available copper, said heat exchanger element being operative to transfer hot exhaust gases heat to said oxide forming element, and said oxide forming element being in contact with a stream of oxidizing gas inducted into said induction system through said heat exchanger element, whereby the copper of said oxide forming element is raised to a temperature of at least 200° C. during operation of the engine in heated conditions between light loads and full load to produce a non-coherent copper oxide film on the surface of the oxide forming element and particles from this film are entrained by the gas stream.

2. An induction system according to claim 1, wherein the oxidizing gas is air admitted through an orifice placing the heat exchanger in communication with the atmosphere.

3. An induction system according to claim 13 wherein the heat exchanger element is a copper tube and said tube is said oxide forming element.

4. An induction system according to claim 3, wherein the stream of oxidizing gas is inducted through the tube into an inlet manifold connected to the inlet ports of the engine, and the exterior of the tube is exposed to hot exhaust gases leaving the engine through an exhaust manifold connected to the exhaust ports of the engine.

5. An induction system according to claim 4, wherein means are provided to restrict the flow of air through the tube to a level which is at all times small compared to the total gas flow through the induction system.

6. The induction system of claim 1 wherein air is primarily supplied through induction means of a capacity less than that normally required for the efficient operation of the intended internal combustion engine with the particular carburettor, and the would-be air deficiency is supplied through said heat exchanger element.

7. The induction system of claim 6 wherein said induction means includes an inlet manifold having air flow controlling means with an air passage of a smaller than the acceptable normal cross section of the particular carburettor for the intended internal combustion engine.

8. The induction system of claim 7 wherein said air flow controlling means is in the form of a carburettor adjusted to provide a reduced air/fuel ratio as compared to that normally acceptable for the particular engine-carburettor combination in accordance with the gas supplied through said heat exchange element.

9. An inlet and exhaust manifold system for an internal combustion engine, comprising a tube to which atmospheric air is admitted at one end, the other end of the tube having an orifice opening into the inlet tract of the engine as selectively defined by the inlet manifold or the inlet ports of an engine to which the system is fitted, an intermediate portion of the tube passing through the exhaust manifold so as to be exposed to hot exhaust gases from an engine to which the manifold is fitted, the tube being selected from tubes formed of copper material, filled with copper material and, lined with copper material allowing the free passage of air, means connected to said tube for restricting the flow of air through the tube to a level insufficient to prevent proper working of the induction system of an engine to which the system is fitted but sufficient to entrain copper oxide particles formed in the portion of the tube exposed to the exhaust gases, said portion of the tube exposed to the exhaust gases being adapted to be heated to temperature of at least 200°C. during the normal operation of an associated engine in heated conditions between light loads and full load to produce non-coherent copper oxide.

10. A manifold system according to claim 8, wherein a plurality of tubes are provided.

11. A manifold system according to claim 8, wherein a portion of at least one of the tubes upstream of the portion exposed to the exhaust gases is wound around the exhaust manifold to preheat the air passing therethrough.

12. A manifold system according to claim 8, wherein the tube terminates in an orifice in the wall of the inlet manifold adjacent the entrance thereof.

13. A manifold system according to claim 8, wherein tubes are provided terminating in nozzles which extend into each of the inlet ports of an engine to which the system is fitted.

14. A manifold system according to claim 8, wherein the tube is provided with a flow restrictor having a flow capacity equivalent to an orifice of 0.2–3.0mm diameter.

15. A manifold system according to claim 14, wherein the flow restrictor is an orifice of 0.4–0.8 mm diameter.

16. A manifold system according to claim 15 wherein the orifice is formed in a cap of flexible material closing the outer end of the tube.

17. A manifold system according to claim 13, wherein the inlet manifold is provided with at least one additional air bleed separate and apart from said tube.

18. A manifold system according to claim 8 wherein said carburettor has a bore containing a choke and a throttle valve and is fitted with a collar between the choke and the throttle valve whereby to reduce the crosssection of the bore in this region as compared to that conventionally provided for the particular engine-carburettor combination.

19. A manifold system according to claim 18, wherein the collar reduces the cross-section of the bore by about 20%.

20. A manifold system according to claim 19, wherein a further similar collar is provided immediately upstream of the choke.

* * * * *